United States Patent
Clark et al.

(10) Patent No.: US 10,302,782 B1
(45) Date of Patent: May 28, 2019

(54) FLEXIBLE DETECTOR FOR X-RAY IMAGING

(71) Applicant: Varex Imaging Corporation, Salt Lake City, UT (US)

(72) Inventors: Scott Clark, Salt Lake City, UT (US); Michael Petrillo, Salt Lake City, UT (US); Richard E. Colbeth, Salt Lake City, UT (US); Cody Bussey, Salt Lake City, UT (US)

(73) Assignee: Varex Imaging Corporation, Salt Lake City, UT (US)

( * ) Notice: Subject to any disclaimer, the term of this patent is extended or adjusted under 35 U.S.C. 154(b) by 0 days.

(21) Appl. No.: 15/989,171

(22) Filed: May 24, 2018

Related U.S. Application Data

(60) Provisional application No. 62/586,888, filed on Nov. 15, 2017.

(51) Int. Cl.
  *G01T 1/20* (2006.01)
  *G01T 7/00* (2006.01)
(52) U.S. Cl.
  CPC .............. *G01T 7/00* (2013.01); *G01T 1/2018* (2013.01)
(58) Field of Classification Search
  CPC .................................... G01T 7/00; G01T 1/20
  See application file for complete search history.

(56) References Cited

U.S. PATENT DOCUMENTS

| | | | |
|---|---|---|---|
| 7,375,341 B1* | 5/2008 | Nagarkar | G01T 1/2002 250/370.11 |
| 8,106,363 B2 | 1/2012 | Yip | |
| 8,242,454 B2* | 8/2012 | Perna | G01T 1/202 250/367 |
| 9,255,997 B2 | 2/2016 | Nakatsugawa | |
| 9,629,586 B2 | 4/2017 | Ghaffari | |
| 9,697,923 B2 | 7/2017 | Tsuji | |
| 2009/0129538 A1* | 5/2009 | Tkaczyk | A61B 6/032 378/5 |
| 2009/0312634 A1* | 12/2009 | Cora | G01T 1/1648 600/436 |
| 2011/0006213 A1 | 1/2011 | Sato | |
| 2013/0010930 A1* | 1/2013 | Nishinou | A61B 6/4283 378/167 |
| 2016/0070002 A1* | 3/2016 | Ishii | G01T 1/2018 250/363.01 |
| 2016/0204164 A1 | 7/2016 | Zhao | |
| 2016/0274249 A1* | 9/2016 | Vogtmeier | G01T 1/2018 |
| 2017/0003401 A1* | 1/2017 | Konkle | G01T 1/2018 |
| 2017/0318651 A1 | 11/2017 | Canfield | |
| 2018/0224566 A1* | 8/2018 | Pohjonen | G01T 7/00 |

* cited by examiner

*Primary Examiner* — Yara B Green
(74) *Attorney, Agent, or Firm* — Laurence & Phillips IP Law

(57) ABSTRACT

Embodiments include a detector with a flexible scintillator screen and a flexible photosensor array and an apparatus with supports coupled to the ends of the detector. The apparatus enables the detector to either flex repeatedly or be flexed and then fixedly held in a flexed configuration.

25 Claims, 13 Drawing Sheets

FLEXIBLE DETECTOR FOR X-RAY IMAGING

RELATED APPLICATION

This application claims priority under 35 U.S.C. § 119(e) to U.S. Provisional Patent Application No. 62/586,888, filed Nov. 15, 2017, titled FLEXIBLE DETECTOR FOR DIGITAL DETECTION, the entire contents of which are hereby incorporated by reference herein.

BACKGROUND

An image detection apparatus that utilizes a flat panel detector is widely used in x-ray digital imaging to generate digital image data. The flat panel detector includes a scintillator for generating fluorescence when exposed to radiation and a pixel array for detecting the fluorescence of the scintillator. The scintillator and the pixel array are disposed on, for example, individual substrates, respectively, and are bonded to each other through an adhesive layer. The radiation is converted into light by the scintillator and the fluorescence of the scintillator is converted into an electrical signal by the pixel array, and, as a result, digital image data is generated.

DETAILED DESCRIPTION

This disclosure relates to a flexible detector for mammography using a flexible photodiode array, a flexible scintillator, and an optically clear adhesive to adhere the photodiode and scintillator together. The disclosure also relates to systems and methods of using the same.

Typically, a scintillator is formed by a vapor deposition method using an alkali halide phosphor such as cesium iodide (CsI), and sodium iodide (NaI), and is configured by a group of columnar crystals formed by growing crystals of the phosphor into columnar shapes. A scintillator responds to incident x-ray radiation by generating visible light that is, in turn, detected by a pixel array.

A pixel array has thousands of radiation sensitive pixels arranged in a matrix of rows and columns that are connected to a readout element. Each pixel 24 has one or more photosensors, such as a p-n diode with a wide intrinsic region (PIN diode) or other light-sensitive component, and an associated switch element of some type, such as one or more thin film transistors, or TFTs. To read out image information from the panel, each row of pixels is selected sequentially and the corresponding pixel on each column is connected in its turn to a charge amplifier. The outputs of the charge amplifiers from each column are then applied to other circuitry that generates digitized image data that then can be stored and suitably image-processed as needed for subsequent storage and display.

The radiation image exposures captured on radiation-sensitive layers are converted, pixel by pixel, to electronic image data which is then stored in memory circuitry for subsequent read-out and display on suitable electronic image display devices. While such imaging systems provide high levels of image quality for diagnostic purposes such as mammography, flat panel detectors have certain limitations and there is room for improvement in patient comfort. Also, there is a need to improve the ability to capture images of deep tissue near a patient's rib cage.

X-ray imaging is a popular medical imaging modality allowing for non-invasively viewing the internal structure and functioning of organisms. The penetrating power of x-rays makes them invaluable for such applications. For example, mammography uses low-energy x-rays to examine a human breast for early detection of breast cancer, typically by detecting a mass or microcalcification. A mammogram is typically obtained by compressing a breast between a flat plate and a flat panel detector to maximize the contact with the flat panel detector. However, compressing a breast against the flat panel detector is often uncomfortable for a patient. Additionally, such conventional methods obtain images without regard to the anatomical shape of a patient's breast. As a result, there is a need for radiation or x-ray detectors that are flexible and may be moved with greater conformity to a patient's particular anatomy.

Figure 1A:
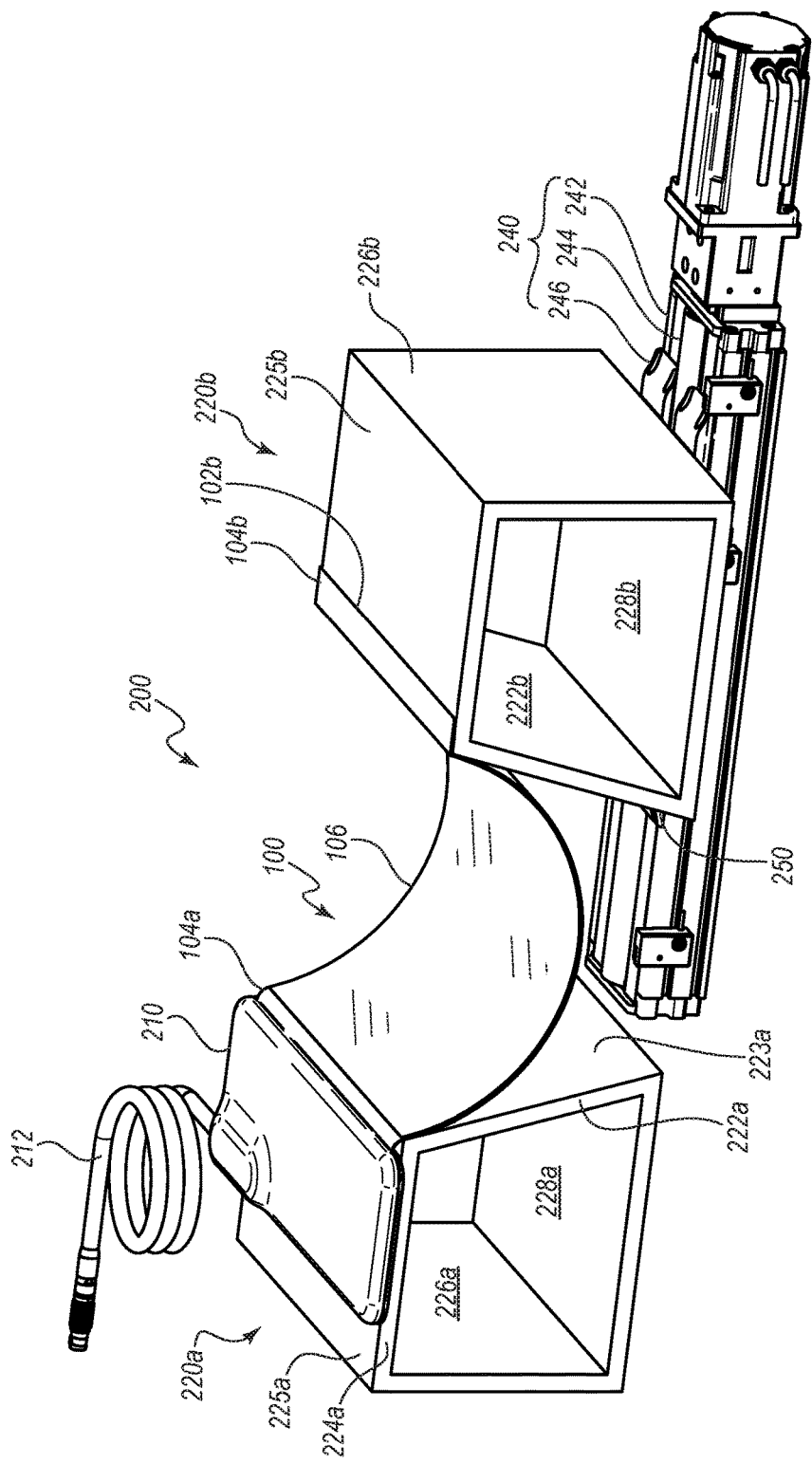
FIG. 1A is a perspective view of a detector held between two supports with one of the supports on a slide positioned to move via a track of a base.
Figure 1B:
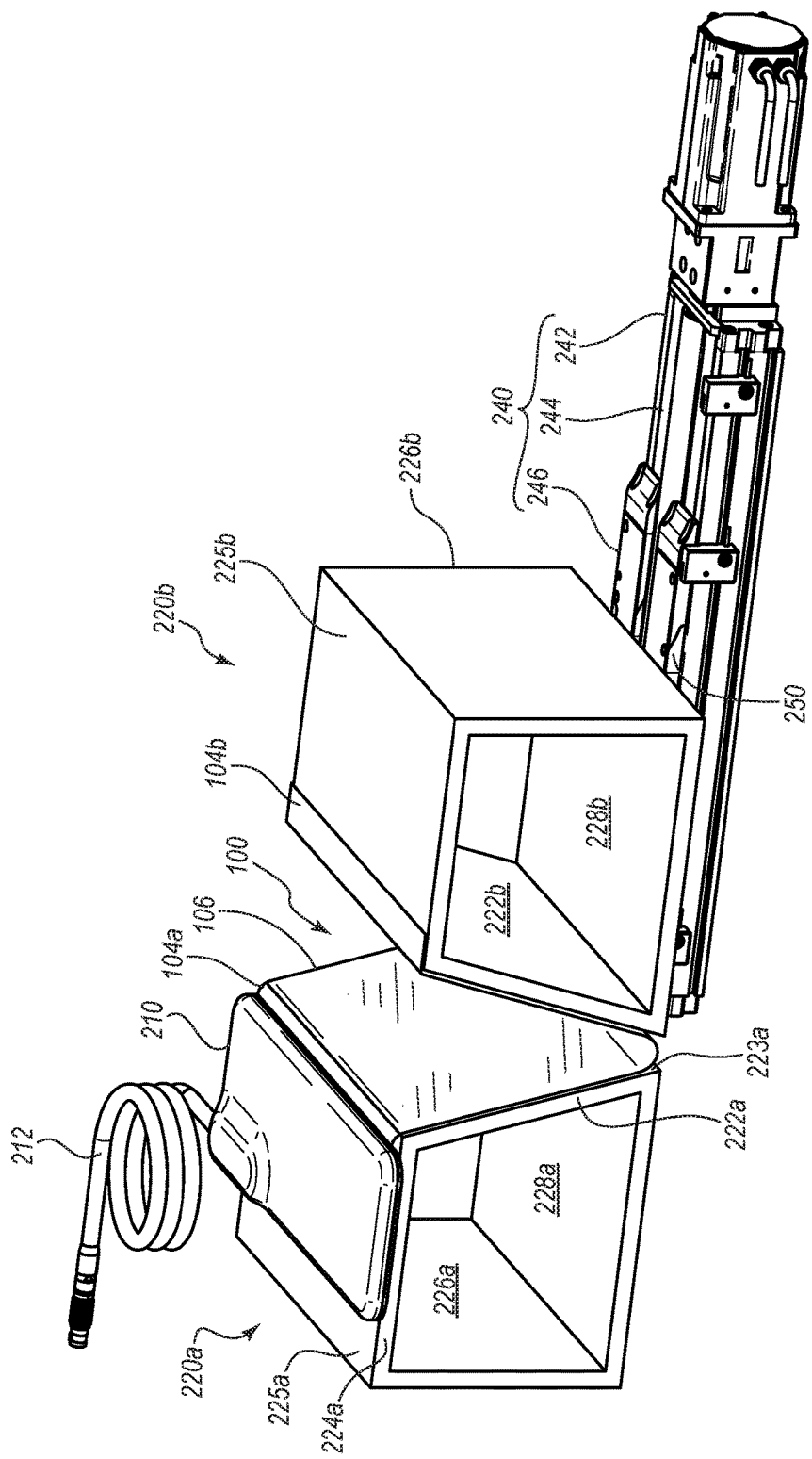
FIG. 1B is a perspective view of the embodiment shown in FIG. 1A after at least one of the supports have been moved such that the ends of the detector are brought closer together.
Figure 5A:
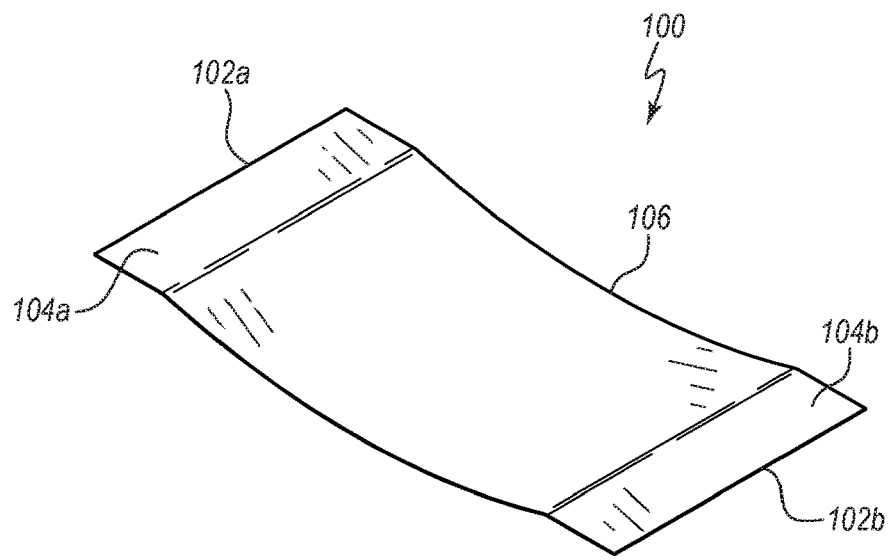
FIG. 5A depicts a detector that is slightly flexed and has a tab at each of its opposing ends.
Figure 5B:
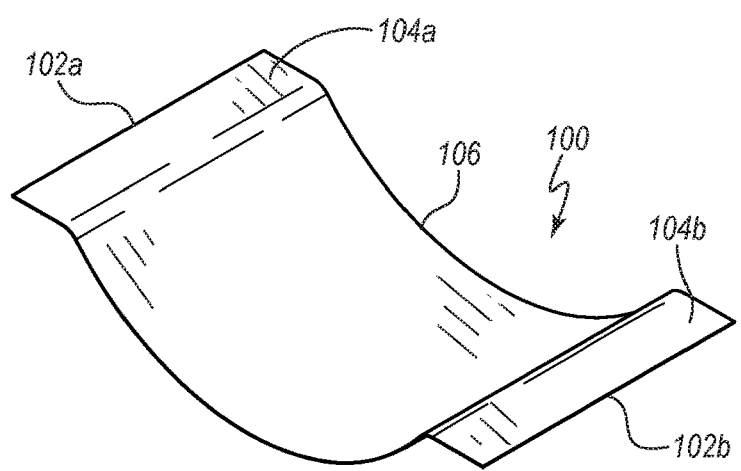
FIG. 5B depicts the embodiment of the detector depicted in FIG. 5A after it has been flexed more than the configuration shown in FIG. 5B.

A detector 100 is depicted in FIGS. 1A-1B being moved from a first position in FIG. 1A to a second position in FIG. 1B. The detector 100 is flexible. As shown in FIGS. 5A-5B, the detector 100 has a first end 102a opposite from a second end 102b on an axis of the flexible detector. For an embodiment of the detector such as the detector 100, which is depicted in FIGS. 5A-5B with a rectangular shape, ends 102a-b are at opposite ends on a longitudinal axis of the detector 100. Each end of the detector 100 has a tab as shown at 104*a-b*. A section 106 extends between the tabs 104*a-b*. As shown in FIGS. 1A-1B, moving the first end 102*a* and the second end 102*b* of the detector 100 such that the detector 100 is moved from a first position to a second position, places the first end 102*a* and the second end 102*b* closer together when the detector is in the second position than in the first position. This movement enables a portion of the detector, namely section 106, to be flexed when the detector is in the second position as shown in FIG. 1B. Moving the first end and the second end of the detector such that the detector is in the second position enables the detector to be curved around a person's body part, such as a breast, and to conform to the anatomical shape of the body part.

Figure 3:
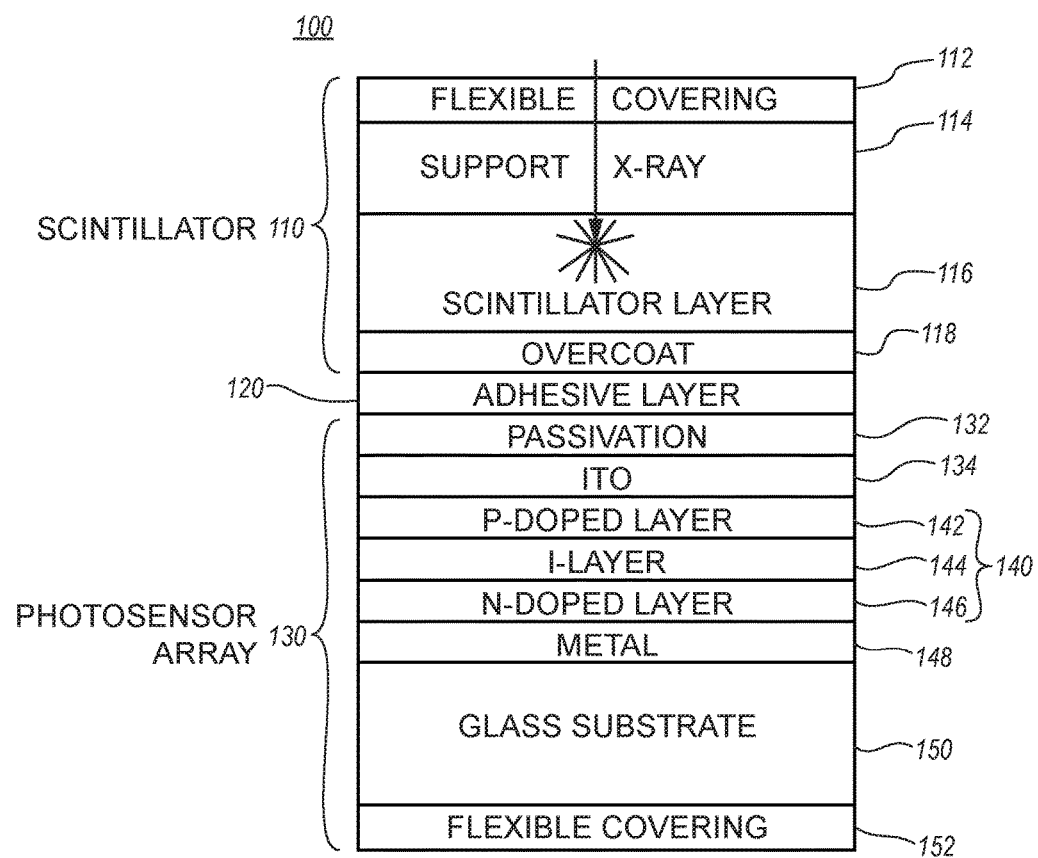
FIG. 3 depicts the layers of a detector.

Some layers that may be used in the detector 100 are shown in detail in FIG. 3. The main layers include a scintillator layer 110, an optically clear adhesive 120, and a photosensor array 130. The layers and any relevant sublayers of these layers are described below in detail with reference to FIG. 3.

Referring back to FIGS. 1A-1B, the detector 100 is part of a digital imaging or detection apparatus 200 that includes electronics component 210, two supports 220*a-b*, and a base 240. Apparatus 200 may be manually or electronically controlled. The electronics component 210 is configured to support imaging via the detector 100 and is connected to a cable 212. The cable 212 may be coupled to a power supply and/or the imaging system. The electronics component may include any conventional electronics components including application specific integrated circuits, both analog and digital printed circuit assemblies, fiber optic and Ethernet communication hardware.

Each support 220*a-b* has a front wall 222*a-b* with a front face 223*a-b*, a top wall 222*a-b* with a top face 225*a-b*, a back wall 226*a-b*, and a bottom wall 228*a-b*. The tabs 104*a-b* are respectively adhered to top faces 225*a-b* such that movement of at least one of the supports 220*a-b* to which a tab is attached enables the tab to also move such that the ends 102*a-b* may be moved closer together or further apart to adjust the curvature of section 106.

Base 240 has a frame 242. A track 244 is fixed to the frame 242 such that the track 244 remains stationary and extends longitudinally within the frame 242. A rail 246 is positioned to slide relative to the track 244. The rail 246 moves relative to the track 244 while the track 244 remains stationary. A carriage 250 is connected to rail 246 for movement along the longitudinal axis of base 240. Support 220 is connected to a carriage 250 at bottom wall 228*b*. Support 220*b* may be moved along the longitudinal axis of base 240 either manually or via electronic controls (e.g., actuator) as carriage 250 is moved.

In some embodiments, such as the embodiment depicted in FIGS. 1A-1B, the base 240, in particular carriage 250, is only coupled to one of the first and second supports 220*a-b*. The base 240 is configured to move one of the second support 220*b* relative to the first support 220*a* to adjust the distance between the ends 102*a-b* of the detector 100. In the embodiment depicted in FIGS. 1A-1B, this movement is achieved by sliding the second support 220*b* on the carriage 250 relative to the track 244 while the first support 220*a* remains stationary.

Movement of the first support 220*b* towards the second support 220*a* enables the detector 100, particularly section 106 of detector 100, to have varying degrees of curvature. The detector 100 is sufficiently flexible to enable the ends 102*a-b* of the detector 100 to be moved to adjust the distance between the ends 102*a-b* of the detector when at least the first support 220*b* is moved relative to the second support 220*a* and for the movement to be repeated. This flexibility permits varying degrees of curvature of the section 106 such that the section 106 may conform to the anatomical shape of a body part, such as a breast, that is to be subjected to x-rays for imaging. Additionally, at least a portion of the front face 223*a-b* of each support 220*a-b* is configured to shape a portion of the section 106 of the detector 106 when the ends 102*a-b* of the detector 100 are sufficiently close together for a portion of section 106 of the detector 100 to drape over the front faces 223*a-b* of the support 220*a-b*.

Movement of the first support 220*b* towards the second support 220*a* enables the detector 100, particularly section 106 of detector 100, to have varying degrees of curvature. The detector 100 is sufficiently flexible to enable the ends 102*a-b* of the detector 100 to be moved to adjust the distance between the ends 102*a-b* of the detector when at least the first support 220*b* is moved relative to the second support 220*a* and for the movement to be repeated. This flexibility permits varying degrees of curvature of the section 106 such that the section 106 may conform to the anatomical shape of a body part, such as a breast, that is to be subjected to x-rays for imaging. Additionally, at least a portion of the front face 223*a-b* of each support 220*a-b* is configured to shape a portion of the section 106 of the detector 106 when the ends 102*a-b* of the detector 100 are sufficiently close together for a portion of section 106 of the detector 100 to drape over the front faces 223*a-b* of the support 220*a-b*.

In FIGS. 1A-1B, the front faces 223*a-b* of the support 220*a-b* are depicted as a plane. In other embodiments, the faces may have other contoured surfaces such as a curved contour or another contour shape.

Figure 2A:
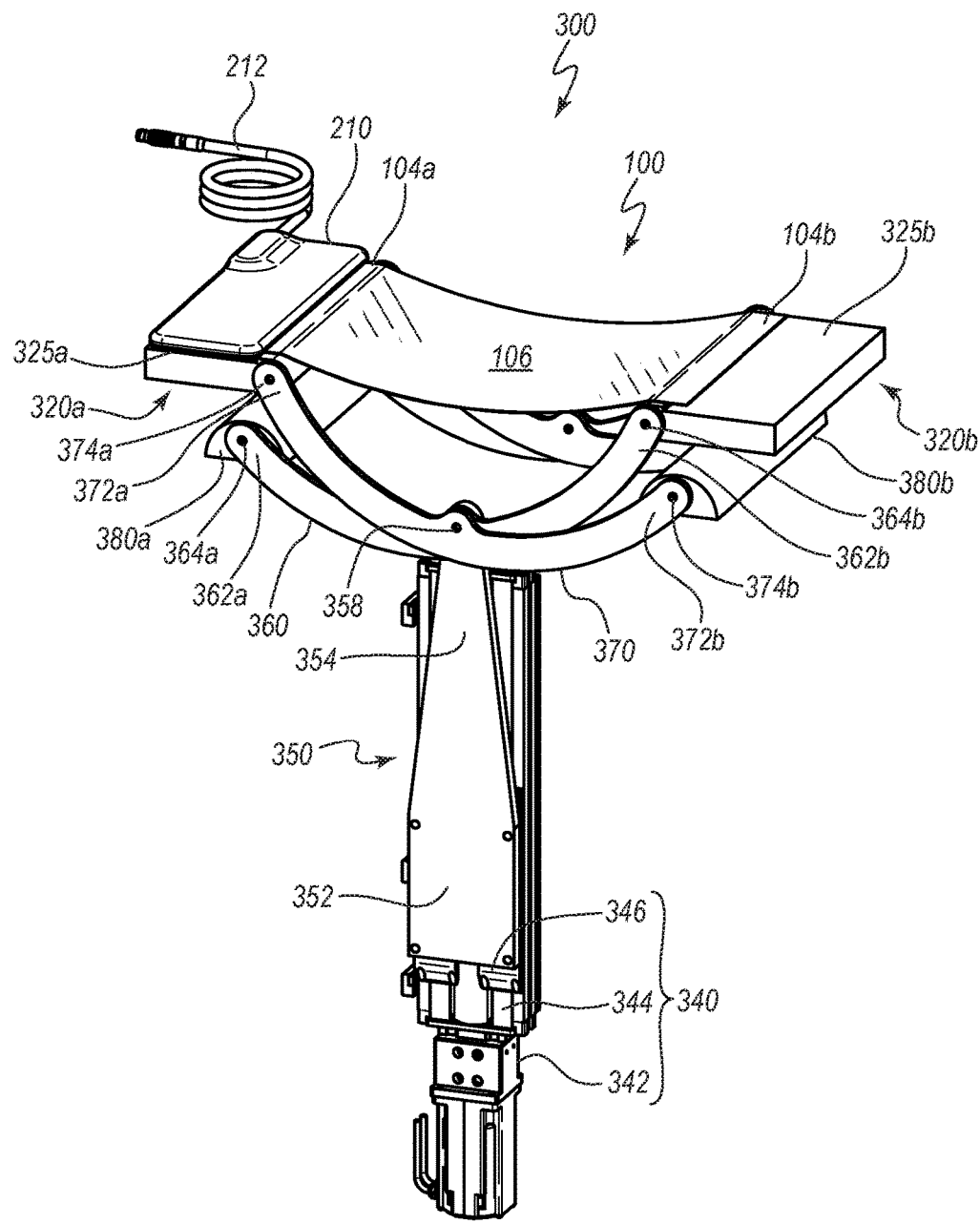
FIG. 2A is a perspective view of another embodiment with a detector between two supports that are each moveable to bring the ends of the detector closer together.
Figure 2B:
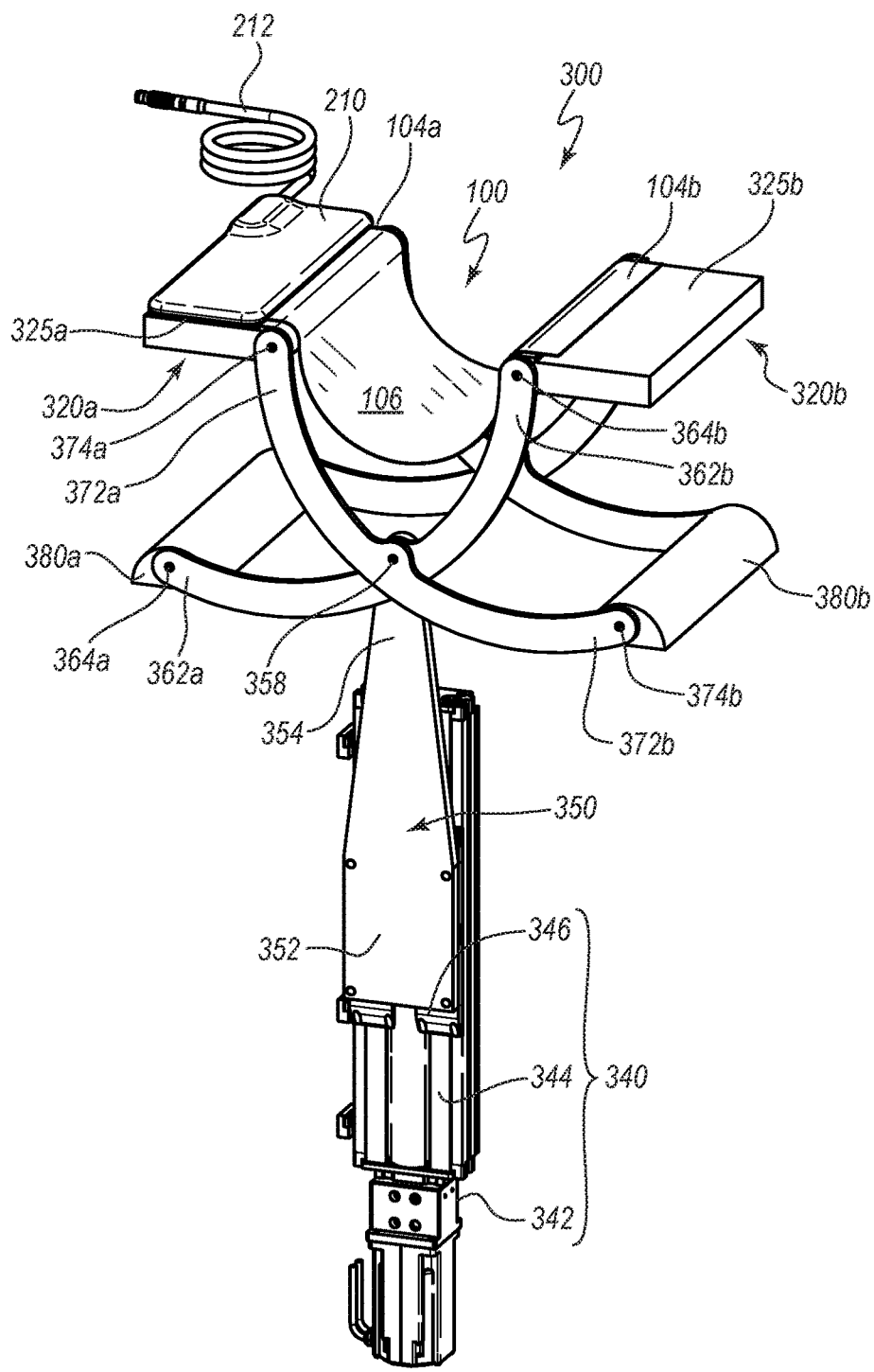
FIG. 2B is a perspective view of the embodiment shown in FIG. 2A after the supports have been brought closer together.

FIGS. 2A-2B depict another embodiment of an apparatus at 300 for adjusting the configuration of detector 100. Like apparatus 200 as depicted in FIGS. 1A-1B, apparatus 300 may be manually or electronically controlled. In contrast to the apparatus 200, which moves support 220*b* horizontally along a single horizontal plane toward support 220*a*, apparatus 300 simultaneously moves detector 100 vertically and horizontally as the ends 102*a-b* are moved with respect to each other. Movement of ends 102*a-b* in apparatus 300 may also be described as moving the first end 102*a* along a first arc and the second end 102*b* along a second arc. When the detector 100 is increasingly flexed it is also simultaneously elevated along a vertical axis. Conversely, as the degree of flexing is diminished, the detector 100 is lowered along a vertical axis. Apparatus 300 includes supports 320*a-b*, which respectively feature top faces 325*a-b*. Tabs 104*a-b* are respectively adhered to top faces 325*a-b* so that tabs 104*a-b* respectively move with supports 320*a-b*.

Apparatus 300 includes a base 340 with a frame 342. A track 344 is fixed to the frame 342 and extends longitudinally within the frame 342. A rail 346 is positioned to slide relative to the track 344. A carriage 350 is connected to rail 346 for movement along the longitudinal axis of base 340. The first and second support 320*a-b* are coupled to the carriage 350 of the base 300 such that each support moves when the slide moves relative to the track.

The supports 320*a-b* are connected to the carriage 350 via a pair of scissor arms 360 and 370 and a pin 358 extending through carriage 350 and the pair of scissor arms 360 and 370. The arm 360 comprises opposing ends 362*a-b* through which pins 364*a-b* respectively extend. The arm 370 comprises opposing ends 372*a-b* through which pins 364*a-b* respectively extend. Pins 374*a* and 364*b* extend respectively through supports 320*a-b*. Pins 374*b* and 364*a* extend respectively through handles 380a-b. The handles 380a-b may be grasped to manually move supports 320a-b via arms 360 and 370. As mentioned above, movement of arms 360 and 370 causes horizontal and vertical movement of ends 102a-b. Vertical movement may be described as raising and lowering the detector 100 relative to the stationary components of base 340. Additionally, the tautness of section 106 of detector 100 may also adjusted by pivoting the supports 320a-b.

The layers of detector 100 are shown in FIG. 3, which is a cross-sectional view, as including a scintillator 110, an optically clear adhesive 120, and a photosensor array 130. The various sublayers are described below. Scintillator 110 has a light-exiting surface over the optically clear adhesive 120 and the photosensor array 130 has a light-accepting surface under the optically clear adhesive 120. In some embodiments, the optically clear adhesive 120 comprises a pressure-sensitive adhesive. The detector 100 may also have flexible coverings 112 and 152 as the outermost surfaces as shown in FIG. 3. Examples of suitable materials for flexible coverings 112 and 152 include but are not limited to urethane, polystyrene, rubber, ethylene propylene diene monomer (EPDM) rubber, vinyl, lacquer, resin, or other suitable materials for providing protection from wear or environmental damage while still allowing for x-ray transmission.

The possible sublayers of the layers of the detector 100 are also shown in FIG. 3. Scintillator 110 has a flexible covering 112, a support layer 114, a scintillator layer 116, and a protective overcoat layer 118 that protects scintillator layer 116. Support layer 114 is highly transmissive to incident x-ray radiation and provides the surface on which an object, such as a breast, is positioned for exposure to x-rays for imaging. The scintillator layer 116 is configured to convert radiation into light photons. The scintillator layer 116 is a porous medium and may be made of various components. In one embodiment, scintillator layer 116 comprises a cesium iodide scintillator. For example, scintillator layer 116 may comprise a typical CsI:Tl layer such as those consisting of about 75% (in volume) of columnar CsI phosphor and 25% (in volume) of air. Scintillator layer 116 may also comprise $Gd_2O_2S$:Tb consisting of about 55% (in volume) of $Gd_2O_2S$ powder phosphor, 17% (in volume) of PVA binder, and 28% (in volume) of air. A protective overcoat layer 118 may be provided for the scintillator layer 116. Protective overcoat layer 118 may comprises any suitable material such as those selected from at least one of polymethyl methacrylate (PMMA), poly(vinylidene fluoride) (PVDF), and polyethylene terephthalate (PET).

In some embodiments, the photosensor array 130 comprises organic electronics, such as organic light-sensing diodes (OLSD), organic photodiodes, and organic transistors. Photosensor array 130 may comprise a PIN diode as photosensor 140, with a p-doped layer 142, an I-layer (intrinsic or undoped layer) 144, and an n-doped layer 146 formed on a metal layer 148, which is itself supported by a substrate 150, typically of polymer. A transparent ITO (Indium-Tin Oxide) layer 134 provides conductive traces. A passivation layer 132 then adds insulation and surface uniformity. The passivation layer 132 may be formed of various suitable materials such as $SiO_xN_y$ and benzocyclobutene (BCB).

Scintillator layer 116 material responds to incident x-ray R by emitting photons toward photosensor 140, but over a broad range of angles, including angles at which the emitted light is effectively wasted due to total internal reflection (TIR) effects within the scintillator layer 116 or, if provided, overcoat layer 118. Using the exemplary arrangement of FIG. 3, as long as there is good optical coupling between scintillator 110 and photosensor array 130, a sufficient amount of the emitted signal is directed toward photosensor 140. In FIG. 3, overcoat layer 118 is illustrated to be in theoretical total contact with passivation layer 132, providing optimal coupling.

Optical adhesives that may be used between the scintillator screen and the detector array include pressure-sensitive adhesives, which are a distinct category of adhesives and have some properties not common to other types of bonding materials. Pressure-sensitive adhesives are aggressively tacky in dry form (solvent-free) at room temperature and firmly adhere to a variety of dissimilar surfaces upon application. Pressure-sensitive adhesives require only light finger pressure for adhesion and no other activation or curing is needed in order to bond the pressure-sensitive adhesives to a compatible surface. There are a number of pressure-sensitive adhesives that are substantially transparent.

Pressure-sensitive adhesives may be formulated with at least one monomer containing a substituted (or an un-substituted) aromatic moiety. Exemplary monomers may provide a thickness as thin as 12.7 μm, a refractive index of 1.48-1.56, a light transmission of greater than 92%, and a good adhesion strength.

Examples of optically clear pressure-sensitive adhesives include the optically clear adhesives manufactured by 3M, St. Paul, Minn. and sold as 8141 and 8142. These pressure-sensitive adhesives may have a thickness of 25.4 μm and 50.8 μm, a refractive index of 1.4742 and 1.4749 at 633 nm, and a haze level of 0.1% and 0.3%, respectively. These pressure-sensitive adhesives may have a light transmission greater than 99% over the visible spectrum and a peel adhesion strength greater than 24 N/100 mm. There are many sizes for these pressure-sensitive adhesives. For example, the adhesives sold by 3M are available as rolls up to 48" wide.

Another option for the pressure-sensitive adhesives includes a cross-linked polymer material such as gel-film PF-40/1.5-X0 manufactured by Gel-Pak™ of Hayward, Calif. The cross-linked polymer material adheres to a surface on contact based on surface tension. These adhesives are transparent and come with different sizes and thickness and may have a typical refractive index in the range of 1.46 and 1.60.

An additional option for the pressure-sensitive adhesives is manufactured by Adhesives Research, Inc. of Glen Rock, Pa. and sold as ARclear™ 8154 and 8932, which may have a thickness of 25.4 um and 50.8 um, and a refractive index of 1.47 and 1.41, respectively. Both adhesives have a visible light transmission of more than 98%.

Figure 4:
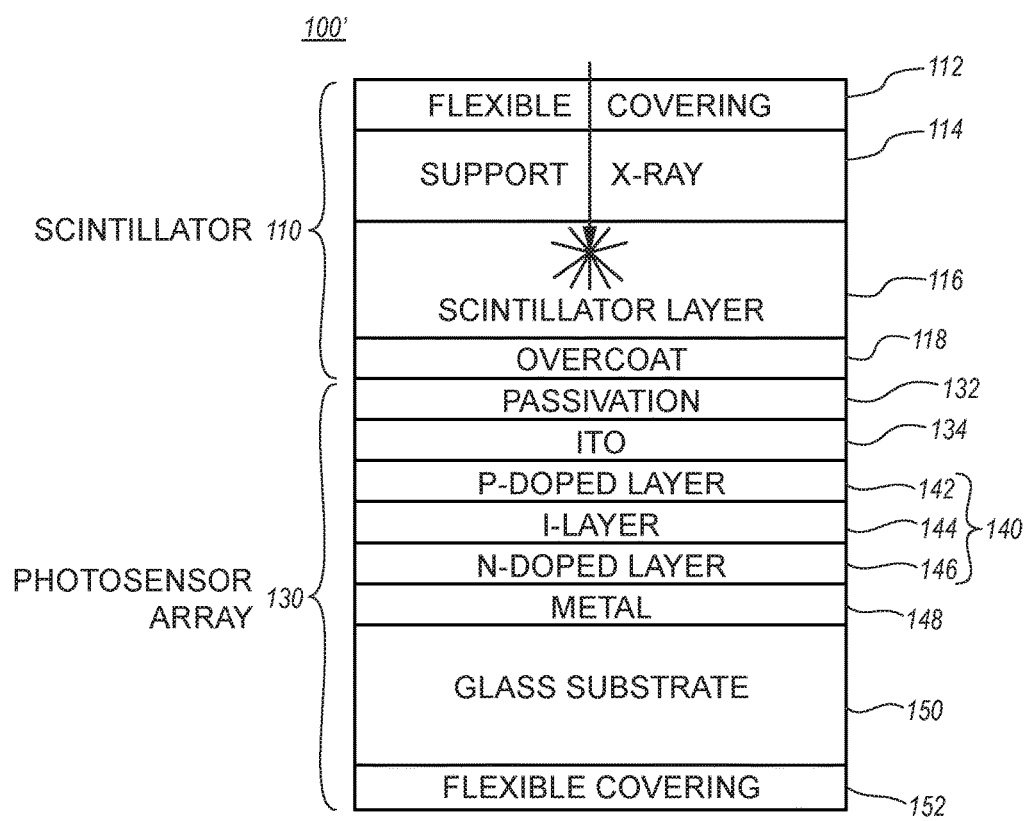
FIG. 4 depicts the layers of another embodiment of a detector.

FIG. 4 depicts a detector 100.' Detector 100' lacks an adhesive layer such as adhesive layer 120 in detector 100 between scintillator 110 and photosensor array 130 but otherwise has the same layers as detector 100. One exemplary embodiment in which detector 100' may be used is described below with reference to FIG. 11.

Figure 10:
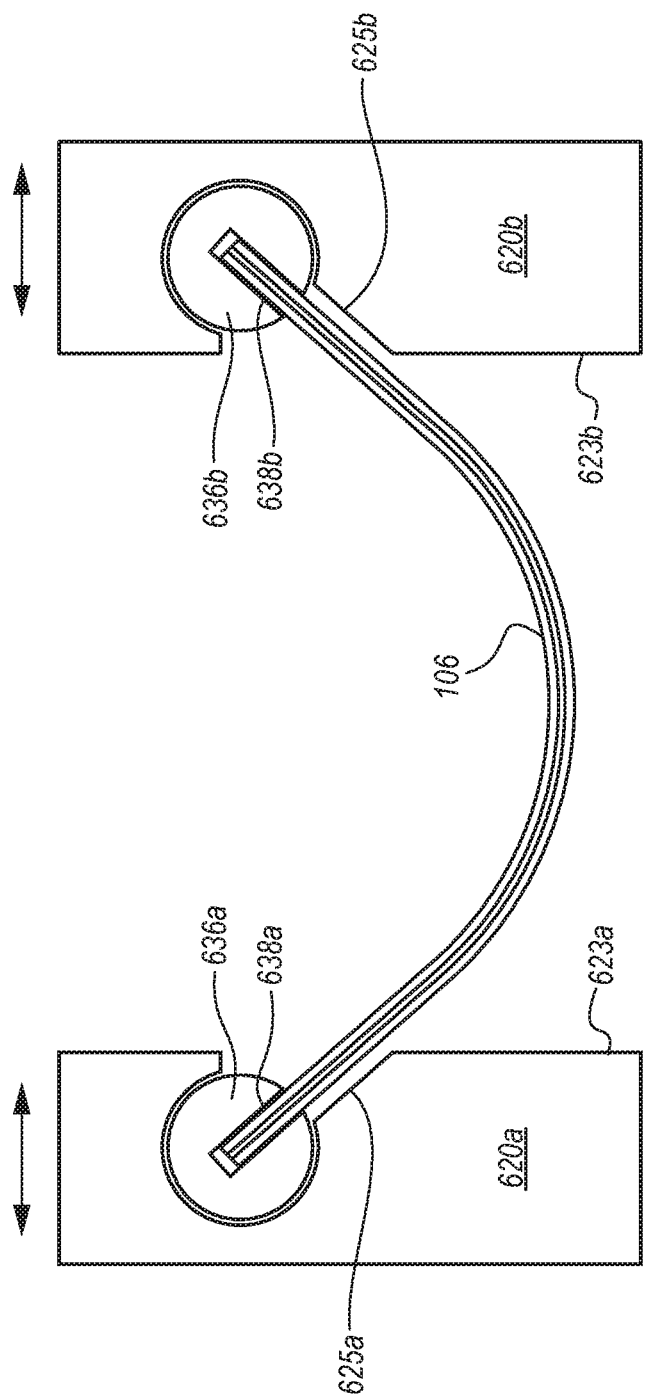
FIG. 10 depicts a cross-sectional view of a detector with each end of the detector positioned within a slot of a pivot.

FIGS. 5A-5B depict a detector with its ends 102a-b, tabs 104a-b, and section 106. Tabs 104a-b are angled with respect to section 106. Section 106 is shown slightly flexed in FIG. 5A and more significantly flexed in FIG. 5B. While the embodiment of the detector depicted at 100 has tabs 104a-b, in another embodiment, the detector has opposing ends with a section between the ends that flexes but lacks tabs, as shown in FIG. 10. In some embodiments, such as the embodiment depicted in FIGS. 2A-2B, when the detector 100 has been moved from a first position to a second position, at least a majority of the flexed portion, namely section 106, is suspended between the first support 220a and the second support 220b without support for the flexed portion. When second support 102b is moved toward first support 102a to the second position as shown in FIG. 1B, a portion of the section 106 is flexed like in the embodiment depicted in FIG. 2B while adjacent portions are also flexed by being shaped by the front faces 123a-b as portions of section 106 become draped over front faces 123a-b. Such portions of section 106 may be supported by a face, lightly draped, or more forcefully drawn over the face or other structures to impart a shape to the section 106 and to the object being imaged. The degree of flexing may be quantitatively described based on the bending radius as any bending that occurs and may be qualitatively described as sufficient bending for a patient to notice a more comfortable clinical experience relative to a flat detector. These various options permitted through the use of a flexible detector permit deep tissue to be more effectively imaged.

Figure 6B:
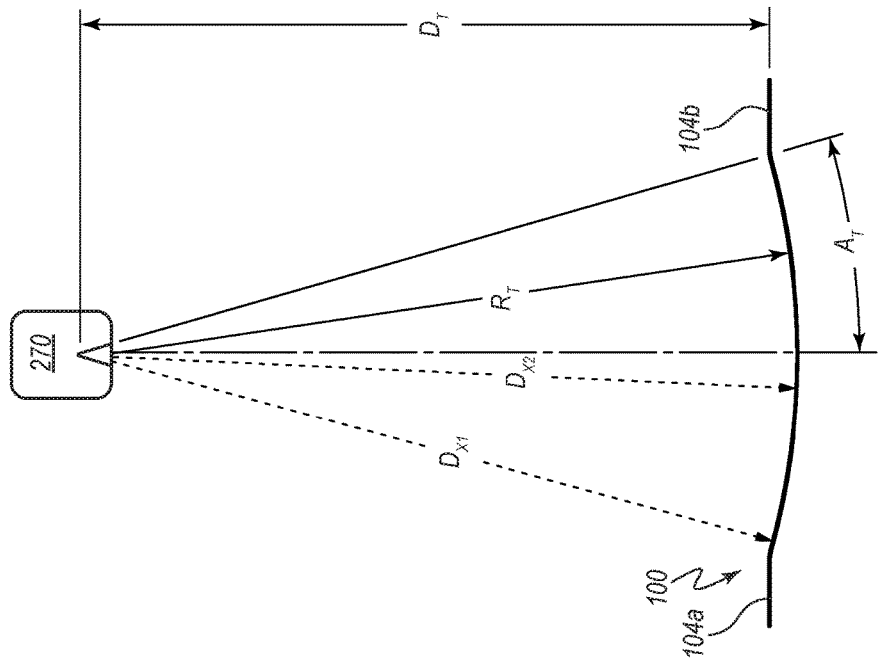
FIG. 6B depicts an x-ray source tube directing x-rays to a detector that extends in a configuration that is slightly flexed.
Figure 6A:
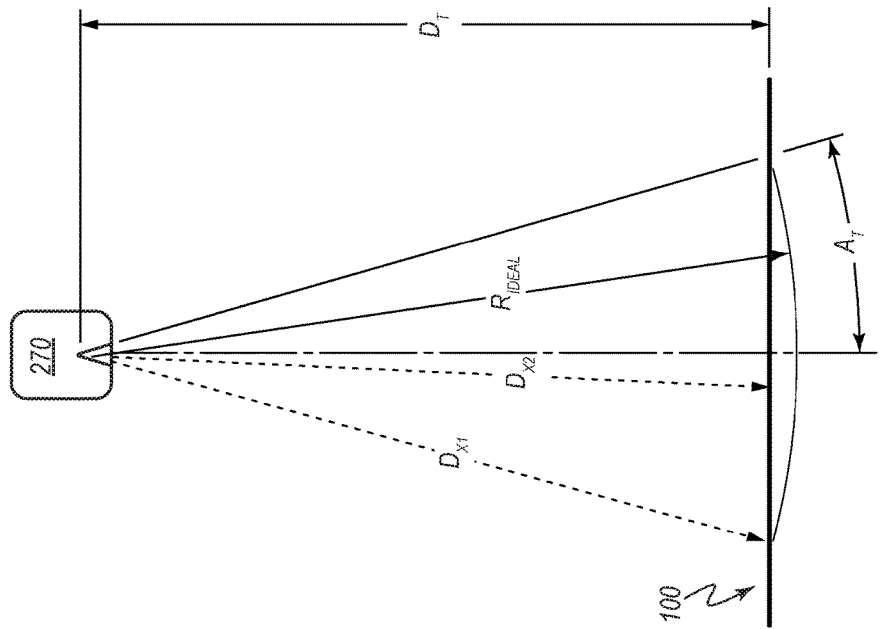
FIG. 6A depicts an x-ray source tube directing x-rays to a detector that extends in a flat configuration prior to being flexed.

FIGS. 6A-6B depict an x-ray source tube 270 directing x-rays to a detector 100 that is flexible and can be positioned in a flexed configuration, as shown in FIG. 6B, after moving from a flat configuration, as shown in FIG. 6A. The perpendicular distance between the x-ray source in tube 270 to the detector 100, when the detector is in the flat configuration, is identified at DT. However, the distance between the x-ray source in tube 270 to the detector 100 depends on the location of the impact of the x-rays at the detector 100. For example, x-rays directed non-perpendicularly to the detector 100, in the flat configuration in FIG. 6A, are identified with dashed lines and have distances $D_{X1}$ and $D_{X2}$ between the x-ray source in tube 270 and the detector. For a flat configuration, the distance may vary as the angle of incidence varies from perpendicular. For example, $D_{X1}$ and $D_{X2}$ depict distances that respectively decrease in length as the angle of incidence is brought closer to being perpendicular when directed to the detector 100 in a flat configuration as shown in FIG. 6A. However, because it is preferable for the angle of incidence to be perpendicular or approximately perpendicular, FIG. 6A depicts an ideally oriented x-ray as $R_{IDEAL}$ when the detector 100 has been moved from a flexed configuration to flex configuration. $A_T$ depicts the preferred range for the angle of the target. FIG. 6B depicts the detector 100 only in the flexed configuration. In FIG. 6B, $R_T$ depicts an x-ray oriented perpendicularly to a tangent of the detector within $A_T$. In FIG. 6B, $D_{X1}$ and $D_{X2}$ are equal distances in contrast to $D_{X1}$ and $D_{X2}$ in FIG. 6A in which $D_{X1}$ is a greater distance than $D_{X2}$.

Figure 7B:
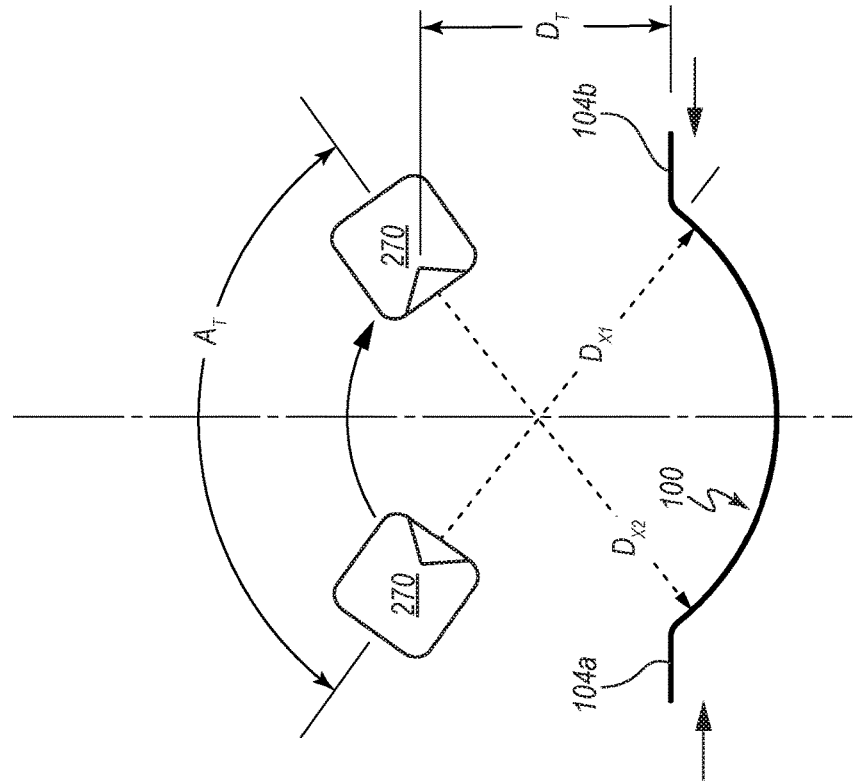
FIG. 7B depicts the x-ray source tube depicted in FIGS. 7A-7B after the tube has been pivoted to direct x-rays perpendicular to a tangent of the detector.
Figure 7A:
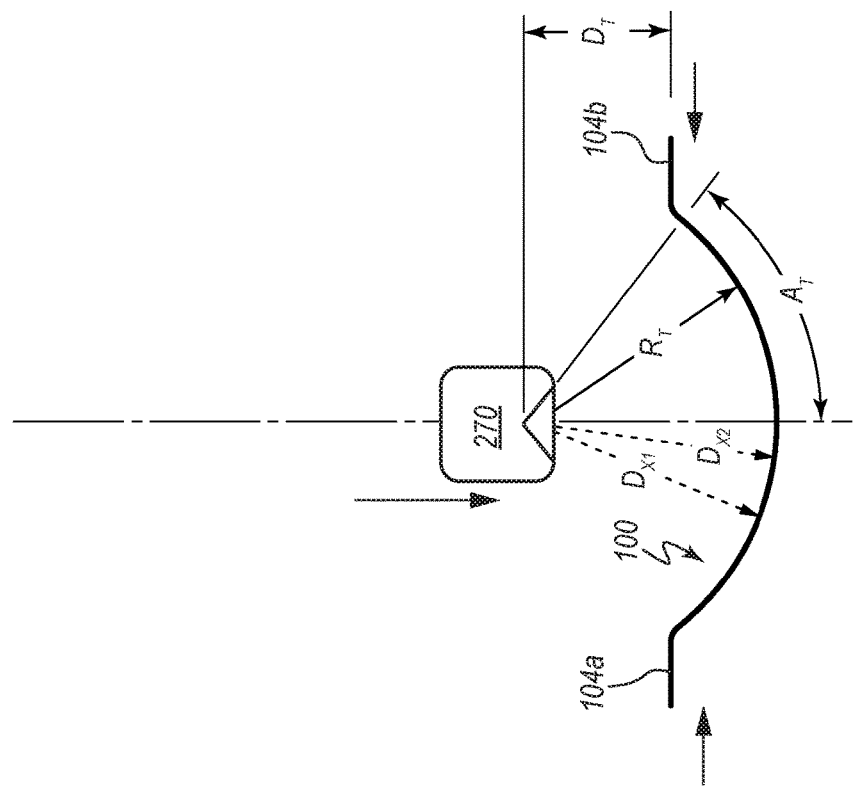
FIG. 7A depicts the x-ray source tube depicted in FIG. 6B after the detector has been further flexed and the tube has been moved closer to the detector.

Like FIG. 6B, FIGS. 7A-7B depict x-rays being directed toward the flexible detector 100 in a flexed configuration. $D_{X1}$ and $D_{X2}$ in FIGS. 7A-7B are thus also equal in contrast to the varying distances of $D_{X1}$ and $D_{X2}$ in FIG. 6A. Tube 270 may be moved closer to the detector 100 as shown in FIGS. 7A-7B. Additionally, as shown in FIG. 7B, x-ray source in tube 270 may pivot so that the x-rays are more easily directed at a particular portion of the detector 100 in a perpendicular configuration or nearly perpendicular. Additionally, by moving closer as shown in FIGS. 7A-7B, the x-ray source tube 270 can more easily pinpoint x-rays to an object such as a breast supported by the flexed detector 100. The ability to pivot the x-ray source tube 270 and to move the x-ray source tube 270 up and down permits the apparatus to be effective with deep tissue and less dense tissue.

The bend radius, the minimum radius one can bend the flexible portion of the detector 100 without damaging the function of the detector, may be measured at a centrally located point of the flexible portion as shown in FIGS. 6A-B where $A_T$ begins. In some embodiments, the flexible portion of the detector 100 may have a minimum bend radius of about 35 millimeters (mm), without damaging the function of the detector. In other embodiments, the flexible portion of the detector 100 may have a minimum bending radius in a range from about 30 mm to about 40 mm, from about 25 mm to about 45 mm, and from about 20 mm to about 50 mm, without damaging the function of the detector. In additional embodiments, the flexible portion of the detector 100 has a bend radius less than about 100 mm, 90 mm, 80 mm, 70 mm, 60 mm, 50 mm, 40 mm, 30 mm, 20 mm, 10 mm, and 5 mm without damaging the function of the detector. The bend radius of the flexible portion of the detector 100 may be measured by any conventional test used to measure bend radius when the detector 100 is manufactured in conformance with ASTM W2597-14 Standard Practice for the Manufacturing Characterization of Digital Detector Arrays and/or IEC 62220-1-1 Medical Electrical Equipment-Characteristics of Digital X-ray Imaging Devices: Determination of detective quantum efficiency. With reference to FIG. 3, the scintillator 110, the optically clear adhesive 120, and the photosensor array 130 are configured to have a bending radius less than the bending radius of the detector 100.

Figure 8:
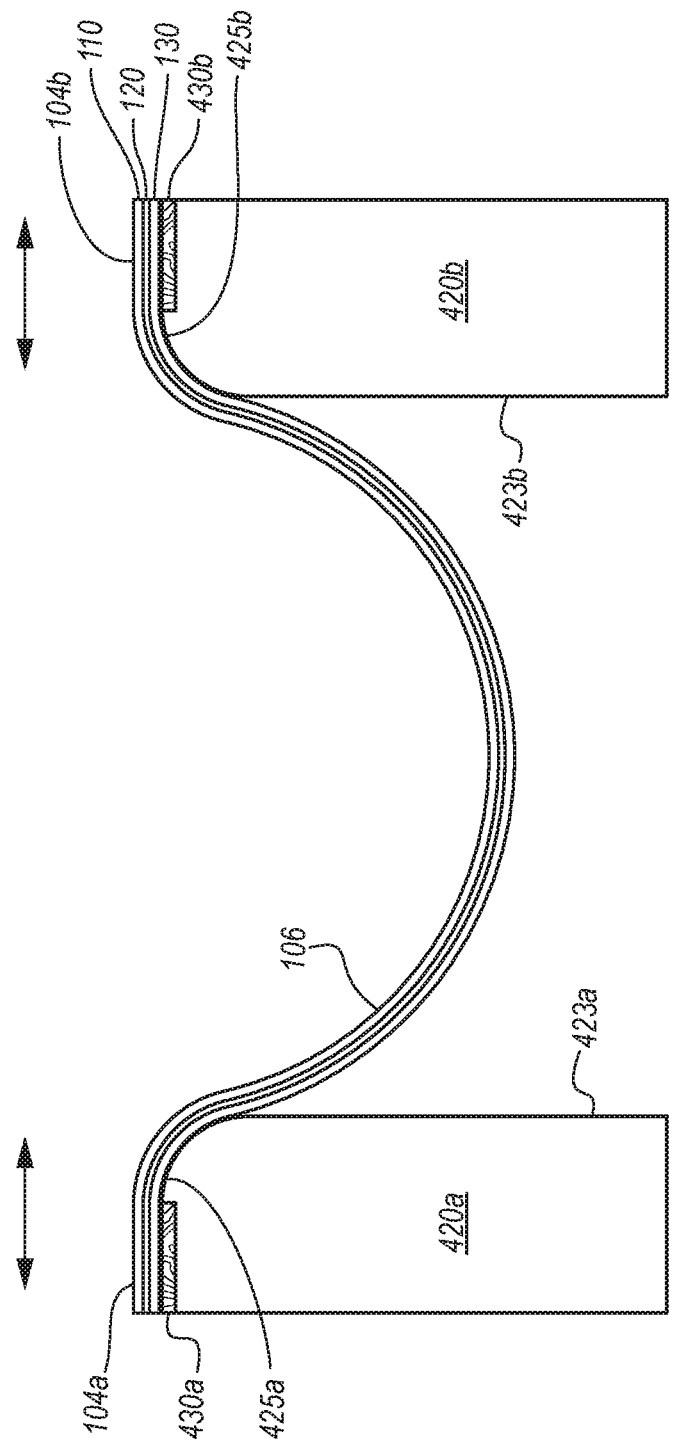
FIG. 8 depicts a cross-sectional view of a detector with each end of the detector adhered to a top face of a support such that the detector extends between two supports.
Figure 9:
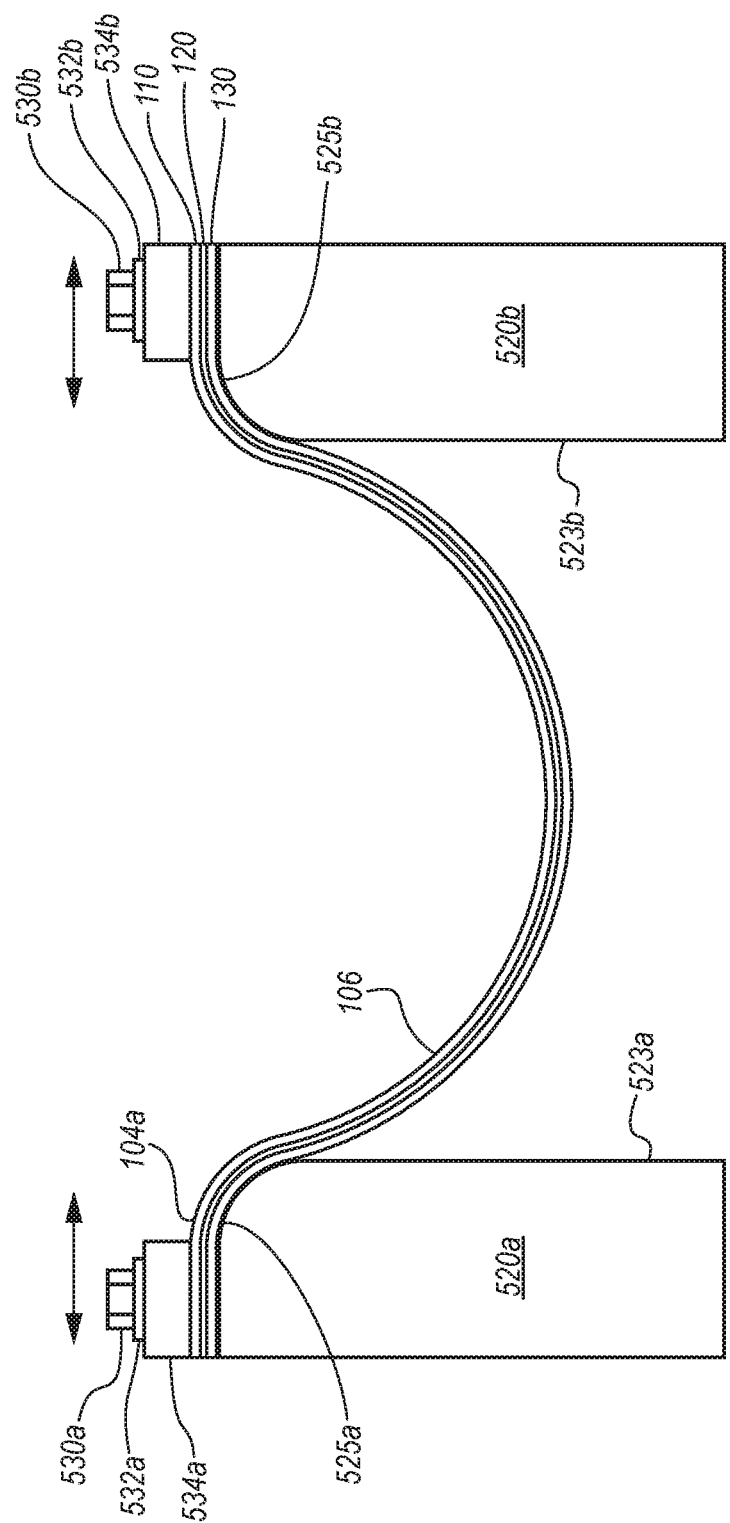
FIG. 9 depicts a cross-sectional view of a detector with each end of the detector attached to a top face of a support via a bolt such that the detector extends between two supports.

FIGS. 8-10 depict various embodiments of detectors and supports. Each of FIGS. 8-10 is a cross-sectional view of a detector with each end of the detector coupled to a support such that the detector extends between two supports. Each support may be coupled to one of the ends of the detector by any suitable means such that the detector 100 extends between the first support 220s and the second support 220b. In each of the embodiments depicted in FIGS. 8-10, the detector 100 is sufficiently flexible to enable the ends 102a-b of the detector 100 to be moved to adjust the distance between the ends 102a-b of the detector 100 when at least the first support is moved relative to the second support and for the movement to be repeated.

FIG. 8 depicts an embodiment of the detector that is like those depicted in FIGS. 1A-1B and FIGS. 2A-2B because adhesive is used to secure the detector to the supports 420a-b. Supports 420a-b have respective front faces 423a-b and top faces 425a-b. Each top face 425a-b has a groove 430a-b for receiving an adhesive 432a-b to adhere to the photosensor array 130 at each of the tabs 104a-b. Unlike supports 120a-b, supports 420a-b have top faces 425a-b and front faces 423a-b that intersect with a smooth, curved configuration such that there is also a smooth, curved transition between tabs 104a-b and section 106 instead of an angle at their intersection. Front faces 423a-b and top faces 425a-b may have any suitable configuration to impart a desired shape to the portions of section 106 that drape over the faces.

FIG. 9 depicts another configuration for connecting the tabs 104a-b of detector 100 to supports 520a-b. Fasteners, such as bolts 530a-b are respectively connected to supports 520a-b through a hole (not shown) in tabs 104a-b and a recess (not shown) in supports 520-b. In addition to bolts, any type of fastener may be used such as screws or rivets. Each bolt 530a-b extends respectively through a first washer 532a-b and a second washer 534a-b. First washer 532a-b has wider diameter than the head of bolts 530a-b. Second washer 534a-b has a wider diameter than the first washer 532a-b and applies forces to a wider area of tabs 104a-b than the head of bolts 530a-b could. Front faces 523a-b and top faces 525a-b are respectively shaped like front faces 423a-b and top faces 425a-b and function in a similar way.

FIG. 10 depicts an embodiment of detector 100 in which the tabs 104a-b are not angled with respect to section 106 of detector 100 but are a continuous extension from section 106. Supports 620a-b each have a front face 623a-b and an upper face 625a-b. Each front face 623a-b forms an obtuse angle with the corresponding upper face 625a-b. Supports 620a-b each have a receptacle 630a-b shaped to house a pivot 636a-b. Each pivot 636a-b has a slot 638a-b shaped to receive one of the tabs 104a-b. This configuration minimizes fatigue of detector 100 as tabs 104a-b transition to section 106. Fatigue of detector 100 may be further minimized by replacing the angled intersection of each front face 623a-b and each corresponding upper face 625a-b with a rounded transition or by eliminating the need for an upper face 625a-b by replacing the vertically oriented front faces 623a-b with front faces angled inward toward the respective receptacle 630a-b.

The detector may be included in a rotational x-ray system, such as a computerized tomography (CT) scanner. Computerized tomography (CT) involves the imaging of the internal structure of an object by collecting several projection images ("radiographic projections") in a single scan operation ("scan"), and is widely used in the medical field to view the internal structure of selected portions of the human body. Typically, several two-dimensional projections are made of the object, and a three-dimensional representation of the object is constructed from the projections using various tomographic reconstruction methods. From the three-dimensional image, conventional CT slices, such as 16 or 64 slices per gantry rotation, through the object can be generated. The two-dimensional projections are typically created by transmitting radiation from a "point source," such as an x-ray tube, through the object, which will absorb some of the radiation based on its size, density, and atomic composition, and collecting the non-absorbed radiation onto a two-dimensional imaging device or imager such as a radiation imager or radiation detector, which comprises an array of pixel detectors (simply called "pixels"). An example of such a CT system is shown in FIG. 11.

Figure 11:
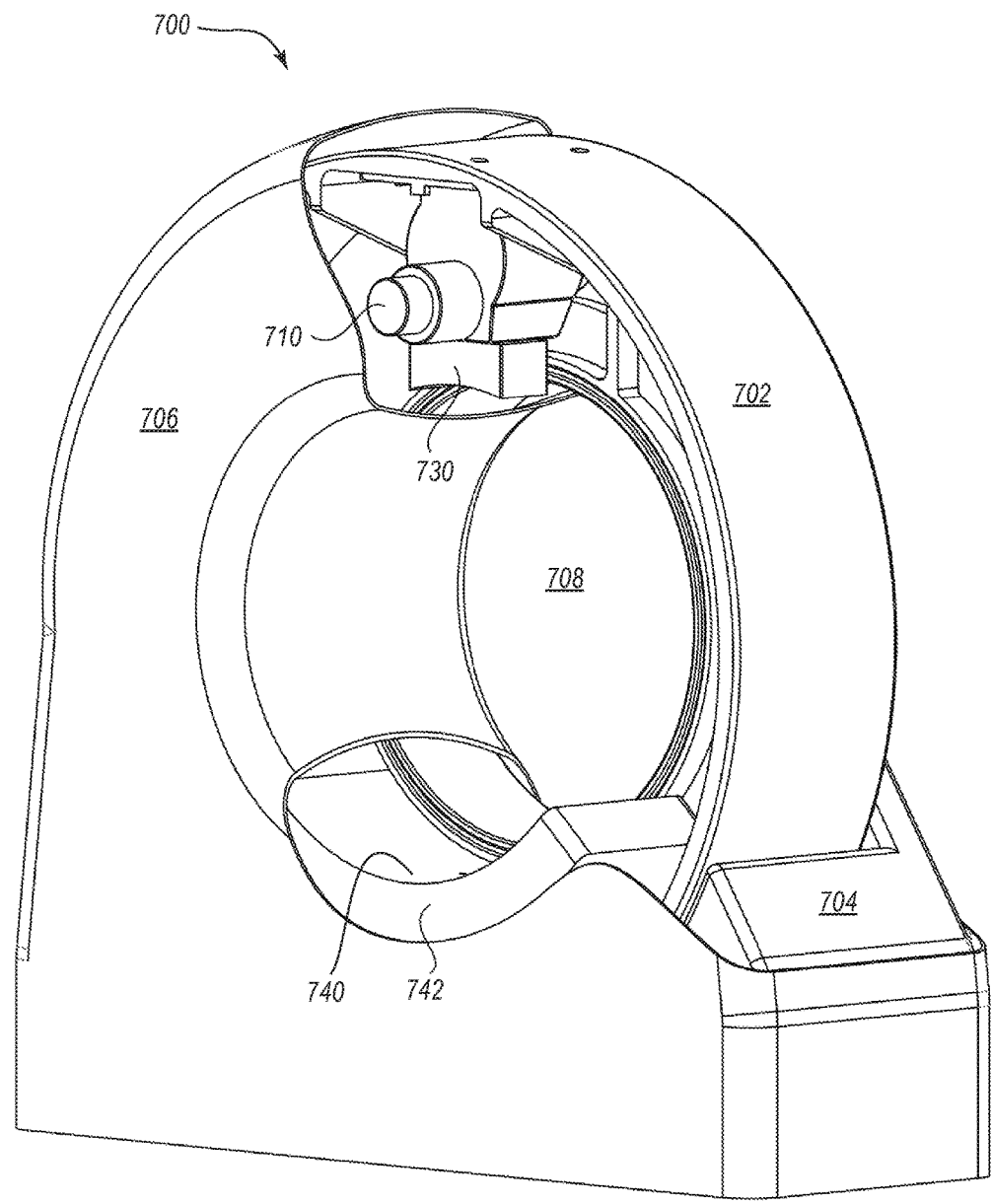
FIG. 11 illustrates a perspective view of a partially exposed gantry assembly with a detector.

FIG. 11 illustrates a partially exposed rotating assembly (or gantry assembly) 700, or gantry, of a rotating x-ray system (or rotational x-ray system). The gantry includes a stationary gantry frame 704 that supports a rotatable gantry frame 702. The rotatable gantry can support an x-ray tube 710, a collimator 730, and a detector 740. Alternatively, the collimator can be coupled directly to the x-ray tube. The gantry also includes a gantry cover 706 to shield the rotating components and frame from a user as well as provide an aesthetic covering. The rotatable gantry frame can include an annular shape, such as the depicted ring shape, that rotates at a high speed about a center of axis in a gantry aperture 708 of the rotatable gantry frame. The centrifugal force (or gantry force) on components disposed on the rotatable gantry frame can experience a high force, which can exceed a gravitational force (g-force, G's, or G loads) or a multiple of the g-force such as 20 times the g-force. In other examples not shown, the rotatable gantry frame may rotate less than a full revolution, such as rotation of 180° or greater in a C-arm scanner.

The detector 740 may be a detector such as detector 100 that is flexed one time into a curved configuration and then remains in the curved configuration. The detector 740 may become curved by manually flexing the detector to conform to the shape of a frame 742 or by placing the detector 740 in the frame 742 and then using the centrifugal force (or gantry force) to cause the detector 740 to conform to the shape of the frame 742. Like the use of apparatus 200 and apparatus 300 to move the detector 100, the rotating assembly (or gantry assembly) 700 also flexes the detector by bringing one end of the detector closer to the other end of the detector. However, the detector 740 in the rotating assembly (or gantry assembly) 700 may be flexed just once and then remain fixed in a curved configuration. Frame 742 may be used to hold the detector 740 in a fixed, curved configuration. When frame 742 is used to hold the detector 740 in a fixed, curved configuration, the detector 740 may be a detector such as detector 100', which lacks an adhesive layer such as adhesive layer 120 in detector 100 between scintillator 110 and photosensor array 130. Frame 742 comprises a first support at one end that is opposite from a second support. Each support of frame 742 is coupled to and supports an end of the detector such that the detector extends between the first support and the second support. Each support of frame 742 has a face positioned to shape a portion of the detector.

The flexible scintillator is an example of means for converting radiation into light photons and having a light-exiting surface. The flexible photosensor array is an example of means for detecting light photons having a light-accepting surface. The optically clear adhesive is an example of means for adhering the light-exiting surface of the flexible scintillator means and the light-accepting surface of the flexible photosensor array means.

The first support is an example of a first means for supporting the first end of the detector. The second support is an example of a second means for supporting the second end of the detector. The base is an example of a means for moving at least one of the supporting means relative to the other support means to adjust the distance between the ends of the detector.

Each supporting means may be configured such that when the detector moves from a first position to a second position, the detector may be curved around a patient's breast in conformance to the anatomical shape of the breast. Each supporting means may also be configured such that when the detector moves from a first position to a second position, a portion of the detector may be curved and other portions may conform to the shape of the supporting means facing the detector.

Although the structures, devices, methods, and systems have been described in accordance with particular embodiments, one of ordinary skill in the art will readily recognize that many variations to the particular embodiments are possible, and any variations should therefore be considered to be within the spirit and scope disclosed herein. Accordingly, many modifications may be made by one of ordinary skill in the art without departing from the spirit and scope of the appended claims.

The claims following this written disclosure are hereby expressly incorporated into the present written disclosure, with each claim standing on its own as a separate embodiment. This disclosure includes all permutations of the independent claims with their dependent claims. Moreover, additional embodiments capable of derivation from the independent and dependent claims that follow are also expressly incorporated into the present written description. These additional embodiments are determined by replacing the dependency of a given dependent claim with the phrase "any of the claims beginning with claim [x] and ending with the claim that immediately precedes this one," where the bracketed term "[x]" is replaced with the number of the most recently recited independent claim. For example, for the first claim set that begins with independent claim 1, claim 3 can depend from either of claims 1 and 2, with these separate dependencies yielding two distinct embodiments; claim 4 can depend from any one of claim 1, 2, or 3, with these separate dependencies yielding three distinct embodiments;

claim 5 can depend from any one of claim 1, 2, 3, or 4, with these separate dependencies yielding four distinct embodiments; and so on.

The phrases "connected to" and "coupled to" are used in their ordinary sense, and are broad enough to refer to any suitable coupling or other form of interaction between two or more elements, including mechanical interaction. Two components may be coupled to each other even though they are not in direct contact with each other. For example, two components may be coupled to one another although there are intermediate elements separating the two elements. The phrases "attached to" or "attached directly to" refer to interaction between two or more components in direct contact with each other and/or are separated from each other only by a fastener of any suitable variety (e.g., mounting hardware or an adhesive).

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

References to approximations are made throughout this specification, such as by use of the terms "about" or "approximately." For each such reference, it is to be understood that, in some embodiments, the value, feature, or characteristic may be specified without approximation. For example, where qualifiers such as "about," "substantially," and "generally" are used, these terms include within their scope the qualified words in the absence of their qualifiers. For example, where the term "substantially the same" is recited with respect to a feature, it is understood that in further embodiments, the feature can be precisely the same.

Recitation in the claims of the term "first" with respect to a feature or element does not necessarily imply the existence of a second or additional such feature or element. Elements specifically recited in means-plus-function format, if any, are intended to be construed to cover the corresponding structure, material, or acts described herein and equivalents thereof in accordance with 35 U.S.C. § 112 ¶6.

Embodiments of the invention in which an exclusive property or privilege is claimed are defined as follows:

1. A digital detection apparatus comprising:
   a detector comprising
      a flexible photosensor array configured to detect light photons and having a light-accepting surface; and
      a flexible scintillator configured to convert radiation into light photons and having a light-exiting surface; wherein the detector has a first end and a second end opposite the first end on an axis of the detector;
   a first support coupled to the first end of the detector;
   a second support coupled to the second end of the detector such that the detector extends between the first support and the second support;
      wherein the detector is sufficiently flexible to enable at least one end of the detector to be moved relative to the other end of the detector to change the distance between the ends of the detector.

2. The apparatus of claim 1, further comprising an optically clear adhesive adhered to a surface of the flexible scintillator and a surface of the flexible photosensor array.

3. The apparatus of claim 1, wherein the flexible scintillator includes a cesium iodide scintillator.

4. The apparatus of claim 1, wherein the flexible photosensor array includes organic electronics.

5. The apparatus of claim 1, wherein the at least one of the first and second support includes electronics configured to support imaging by the detector.

6. The apparatus of claim 1, wherein the first support and the second support comprise a frame, and wherein the apparatus is a gantry apparatus.

7. The apparatus of claim 1, wherein at least one support has a face positioned to shape a portion of the detector.

8. The apparatus of claim 1, wherein at least a section of the detector is suspended between the first support and the second support.

9. The apparatus of claim 1, a base coupled to at least one of the first and second supports;
   wherein the base is configured to move at least one of the supports relative to the other support to adjust the distance between the ends of the detector.

10. The apparatus of claim 9, wherein the base and the supports are configured such that one support may be moved relative to the other support, which remains stationary.

11. The apparatus of claim 9, wherein the base is coupled to the first support and the second support such that the first support and the second support are configured to move relative to each other.

12. A method for digital detection, comprising:
   providing a digital detection system comprising an apparatus, wherein the apparatus comprises a detector, wherein the detector comprises a flexible scintillator having a light-exiting surface opposite from a support surface, and a flexible photosensor array having a light-accepting surface;
      wherein the detector has a first end and a second end;
      wherein the first end and the second end are opposite from each other on an axis of the detector;
      wherein the apparatus comprises a first support and a second support;
      wherein the first support is coupled to the first end of the detector and the second support is coupled to the second end of the detector;
   positioning an object on the support surface; and
   moving at least one end of the detector relative to the other end of the detector such that the detector is moved from a first position to a second position, wherein the first end and the second end are closer together when the detector is in the second position than in the first position, wherein at least a portion of the detector between the first end and the second end is flexed when the detector is in the second position.

13. The method of claim 12, further comprising an optically clear adhesive adhered to the light-exiting surface of the flexible scintillator and the light-accepting surface of the flexible photosensor array.

14. The method of claim 12, wherein, when the detector is in the second position, at least one portion of the detector is supported by a face of one of the supports.

15. The method of claim 12, wherein, when the detector is in the second position, at least a majority of the flexed portion is suspended between the first support and the second support without support for the flexed portion.

16. The method of claim 12, wherein:
   moving at least one end of the detector relative to the other end of the detector occurs along a single axis in a plane.

17. The method of claim 12, wherein:
   moving at least one end of the detector relative to the other end of the detector comprises moving the first end and the second end of the detector.

18. The method of claim 12, wherein the first support and the second support comprise a frame, and wherein the apparatus is a gantry apparatus.

19. The method of claim 12, wherein:
moving at least one end of the detector relative to the other end of the detector enables the detector to be curved around the object and to conform to the shape of the object.

20. The method of claim 12, wherein:
moving at least one end of the detector relative to the other end of the detector enables a portion of the detector to be curved and other portions to conform to a face of each support while the object is compressed between the face of each support.

21. A digital detection apparatus comprising:
a detector comprising
 a flexible scintillator means for converting radiation into light photons and having a light-exiting surface; and
 a flexible photosensor array means for detecting light photons having a light-accepting surface;
 wherein the detector has a first end and a second end;
 wherein the first end and the second end are opposite from each other on an axis of the detector; and
means for supporting the first end of the detector;
means for supporting the second end of the detector; and
 wherein the detector is sufficiently flexible to enable at least one end of the detector to be moved relative to the other end of the detector to adjust the distance between the ends of the detector.

22. The apparatus of claim 21, further comprising:
means for moving at least one of the supporting means relative to the other support means to adjust the distance between the ends of the detector.

23. The apparatus of claim 21, further comprising:
an optically clear adhesive means for adhering to the light-exiting surface of the flexible scintillator means and to the light-accepting surface of the flexible photosensor array means.

24. The apparatus of claim 21, wherein:
the supporting means are configured such that when the detector moves from a first position to a second position, the detector may be curved around a patient's breast in conformance to the anatomical shape of the breast.

25. The apparatus of claim 21, wherein:
the supporting means are configured such that when the detector moves from a first position to a second position, a portion of the detector may be curved and other portions may conform to the shape of the supporting means facing the detector.

* * * * *